R. O. Lowry.

Composite Roof.

No. 2,591. Reissued May 7, 1867.

Witnesses:
Edw. Schafer
Henry Sylvester

Inventor:
Robt. O. Lowry,
by Mason, Fenwick & Lawrence.

United States Patent Office.

ROBERT O. LOWREY, OF TABOR, IOWA.

*Letters Patent No.* 61,746, *dated February* 5, 1867; *reissue No.* 2,591, *dated May* 7, 1867.

IMPROVEMENT IN TILES AND BRICKS FOR ROOFING AND OTHER PURPOSES.

The Schedule referred to in these Letters Patent and making part of the same.

TO ALL WHOM IT MAY CONCERN:

Be it known that I, ROBERT O. LOWREY, of Tabor, in the county of Fremont, and State of Iowa, have invented certain new and useful Improvements in Composition for Roofing or Making Tiles and Brick for Roofing or Other Purposes; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it. In the drawings—

The nature of my invention consists in making water-proof covering for roofing, or slabs or tiles of unburnt or unglazed clay, which are secured firmly down to the roofing boards in a suitable manner, and then covered with a cement which is composed of marl or clay and sand and coal tar mixed together in such proportions that it will readily penetrate the surface of the slabs and form, when dry, a solid, stony surface, which will not be injuriously affected by heat or by exposure to the weather, as will be herinafter described.

Figure 1:
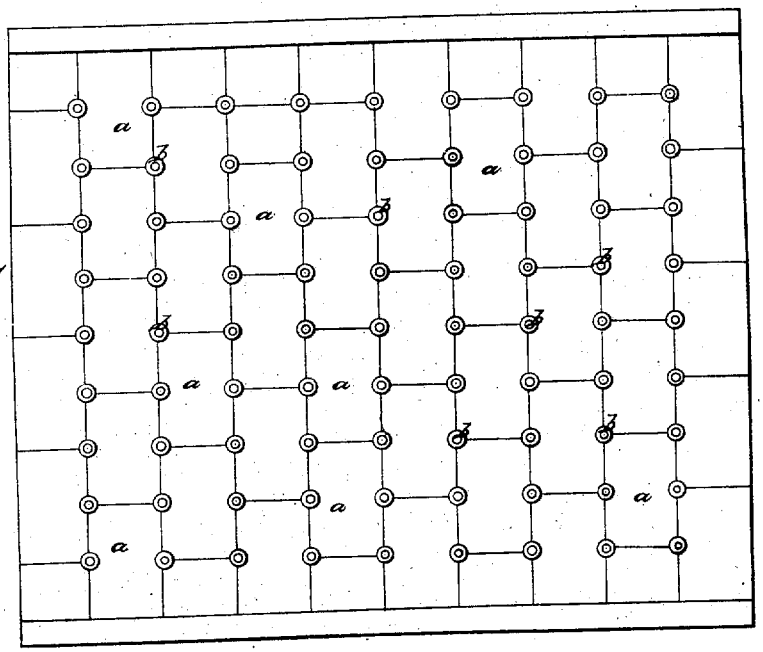
Figure 1 is a top view of the roof with the unglazed tiles secured upon it previous to covering them with cement.
Figure 2:
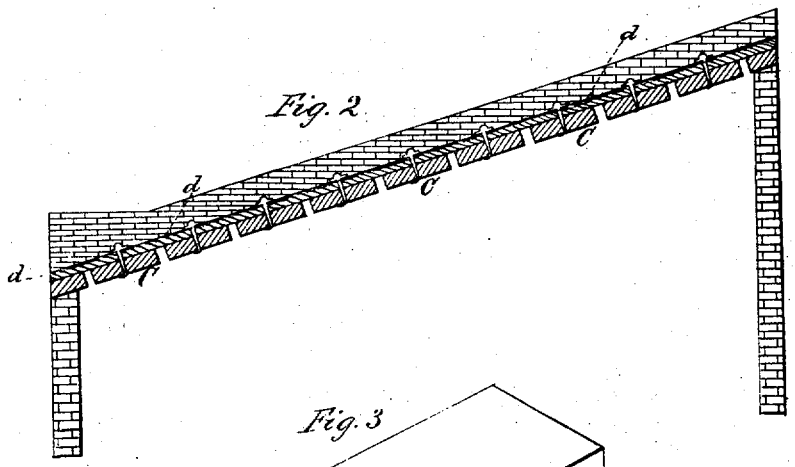
Figure 2 is a sectional view of the roof when finished.
Figure 3:
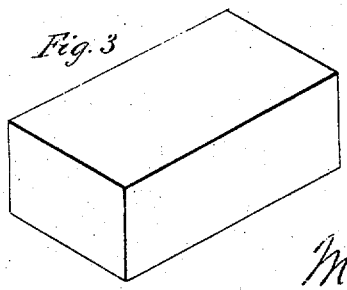
Figure 3 is a sectional view of a portion of an unglazed tile showing the effect of the cement upon it.

The cement consists of marl or clay and sand and coal tar mixed together, when cold or hot, in suitable proportions to form a plastic cement which can be spread upon surfaces with a trowel. The use of raw tar is preferred, as it has been found that boiled tar liquefies under the influence of the sun, whereas the raw tar, when mixed with marl or clay and sand, becomes harder the longer it is exposed to the action of the sun. The cement may be made thick or thin by varying the proportions of the above substances. This cement I use to form the covering for a roof which is constructed as follows:

In the accompanying drawings, *a a* represent thin slabs or tiles of any suitable size, which are arranged upon the roofing boards and cemented together at their edges. These tiles are secured down in place by means of nails having thin washers applied to their heads, which nails are driven between the joints of the tiles into the roofing boards and clinched so as to hold the tiles firmly in place. The tiles *a* are made by mixing clay and sand with water, and moulding the same after the manner of making bricks, after which they are dried, but not burned. The object of using unburned and unglazed tiles is twofold: the cement which I have above described will be absorbed by unburned tiles, and it will also unite with the dried clay very readily, and form, in conjunction therewith, a hard, stony substance, whereas, if glazed or burned tiles were used, there would be no commingling of the cement with the clay, but it would lie upon the surfaces of the tiles without striking into their substance and hardening them. The cement which I have above described is now spread evenly upon the tiles with a trowel, or, if desirable, it may be made so thin by an addition of coal tar as to be easily applied to the surfaces of the tiles with a brush. A portion of the coal tar of the cement will be quickly absorbed by the tiles, and in the course of a few weeks, or even in less time, a hard crust will be formed, resembling stone, which will be impervious to the action of water. There is not only a stony crust formed on top of the slabs *a*, but the cement will strike into them and render their upper surfaces very hard and stony, and, by firmly adhering to them, form an even, solid surface. If, from any cause, the upper crust should be broken or cracked off in some places, there will still be left a hard, stony surface impervious to water. In the drawings, *b* represents the nails which are used for securing the tiles upon the roofing boards. *c c* are the roofing boards, and *d* represents the covering of cement applied to the surfaces of the tiles *a*. It will be seen by reference to fig. 2 that the covering upon the roofing boards forms a solid surface, consisting first of tiles made of clay and sand, and second of plastic cement made of marl or clay and sand and coal tar. This covering will, after some length of time, turn to stone, or to a substance resembling stone in hardness and durability, which will not be injured by heat or cold, and which will be perfectly water-proof. By employing a foundation of dry, porous tiles of unglazed clay and sand, the cement will be quickly absorbed, and consequently my roofing is applicable to very steep roofs, as well as to those having only a slight inclination, as the cement will not run and leave places uncovered and unprotected. Another advantage of my improved roofing is, that the swelling and shrinking of the roofing boards will not be liable to crack and cause it to leak. It is easily and cheaply applied, and is perfectly fire-proof.

Having thus described my invention, what I claim as new, and desire to secure by Letters Patent, is—

1. A plastic cement composed of marl or clay and sand and coal tar mixed together in suitable proportions, substantially as described.

2. A roof composed of unglazed and unburned slabs or tiles, which are secured firmly down upon the roofing boards and then covered with a cement consisting of marl or clay and sand and coal tar, substantially as described.

ROBT. O. LOWREY.

Witnesses:
W. C. DODGE,
WM. L. LOWREY.